Nov. 22, 1960  J. PICKLES  2,961,032
SEAT ADJUSTER MECHANISM
Filed Aug. 26, 1957  3 Sheets-Sheet 1
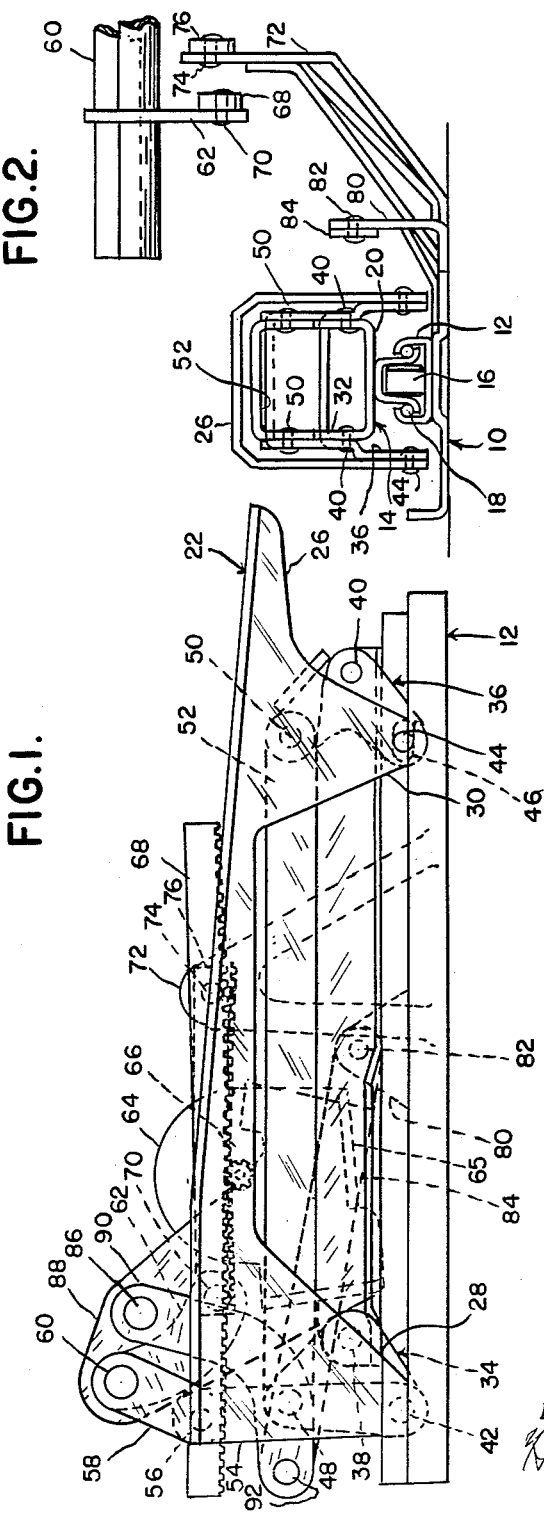
INVENTOR.
JOSEPH PICKLES
BY Whittemore,
Hulbert & Belknap
ATTORNEYS

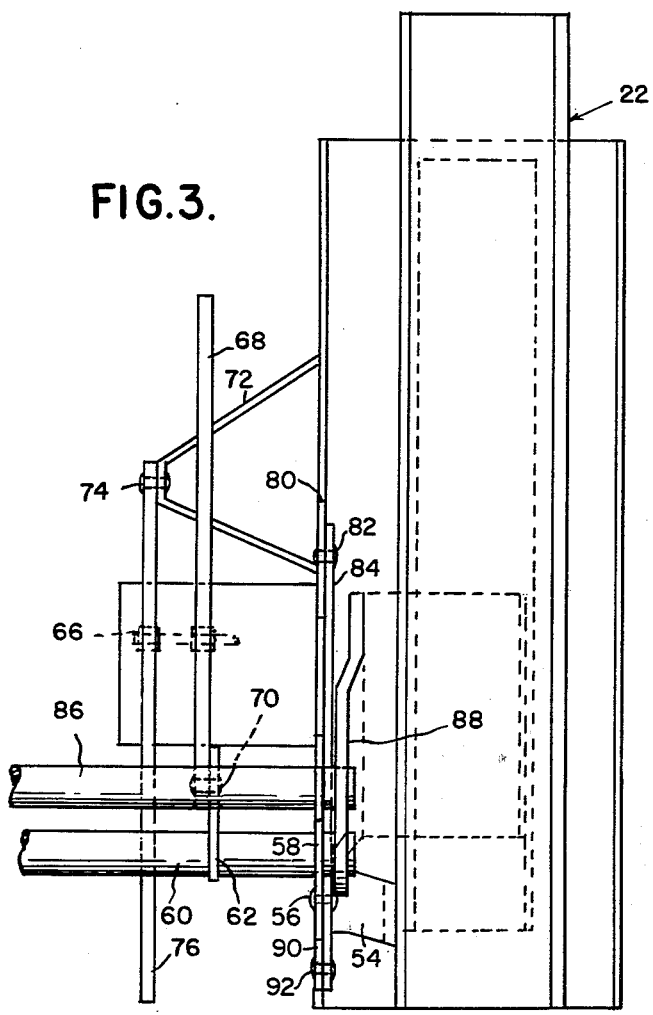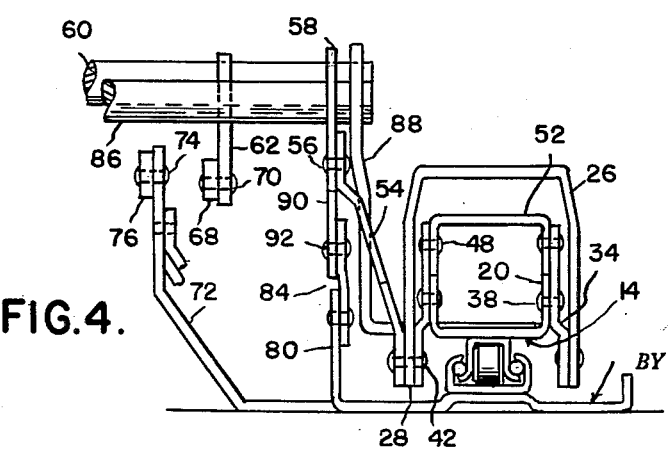

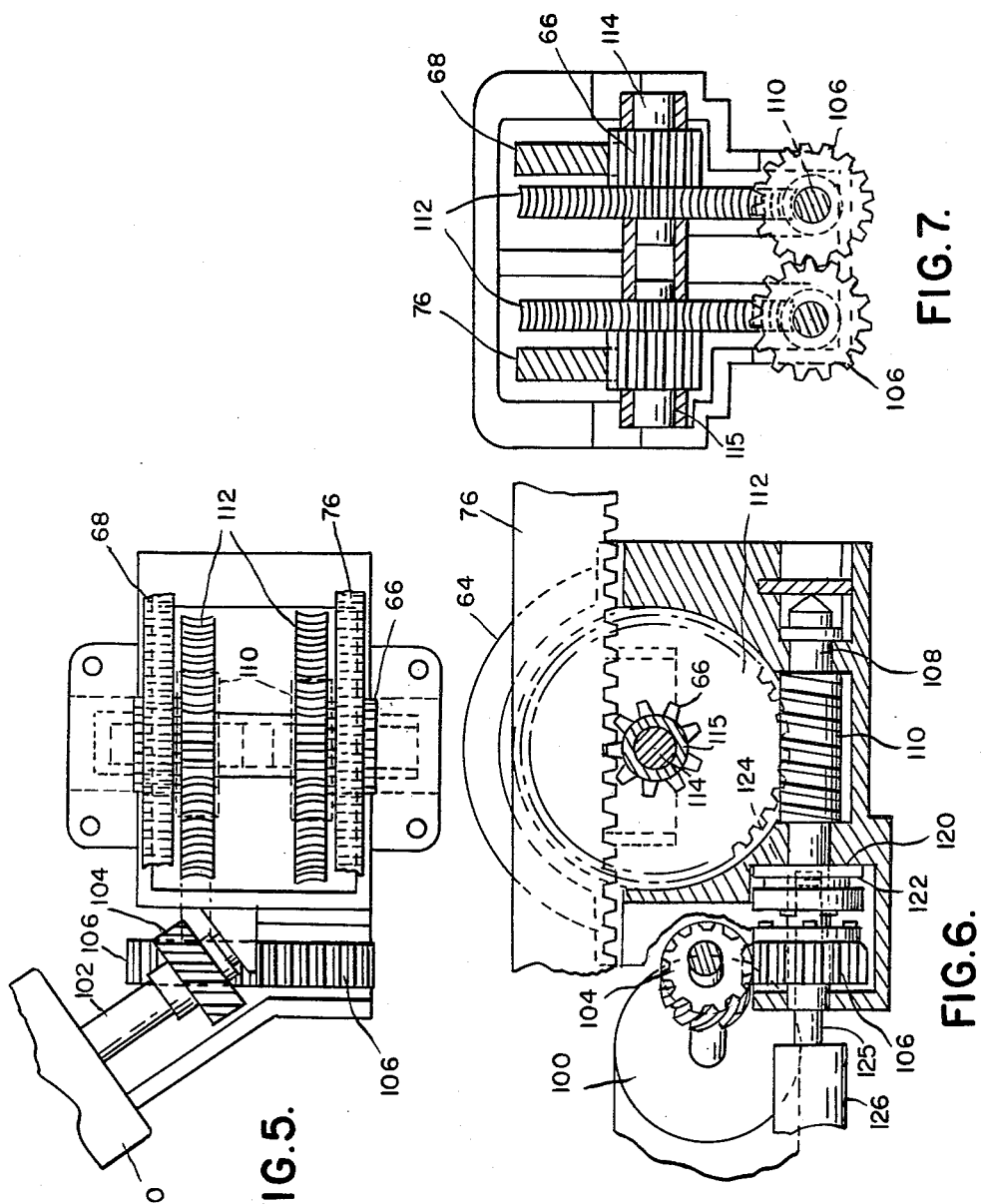

United States Patent Office 2,961,032
Patented Nov. 22, 1960

2,961,032

SEAT ADJUSTER MECHANISM

Joseph Pickles, Dearborn, Mich., assignor to Ferro Stamping Company, Detroit, Mich., a corporation of Michigan Filed Aug. 26, 1957, Ser. No. 680,288

16 Claims. (Cl. 155—14)

The present invention relates to seat adjuster mechanism.

It is an object of the present invention to provide simplified power actuated seat adjuster mechanism capable of adjusting a vehicle seat in fore and aft directions as well as vertically.

It is a further object of the present invention to provide power actuated seat adjustment mechanism including drive means for effecting adjustable seat support mechanism at one end of a vehicle seat, means for converting seat adjusting movement of the mechanism to rotary movement, transversely extending torque rods operable to transmit corresponding relative motion to seat adjustment mechanism at the other end of the seat.

It is a further object of the present invention to provide seat adjuster mechanism including a pair of devices each including a fixed rail, a slide movable longitudinally on the rail, a seat support bar, and adjustable linkage connecting the bar to the slide for movement therewith longitudinally of the rail and for relative movement thereto in a vertical plane.

It is a further object of the present invention to provide mechanism as described in the preceding paragraph including transversely extending torque rods to insure equal relative movement of the parts at opposite ends of the seat so as to avoid binding.

It is a further object of the present invention to provide mechanism as described in the foregoing including power actuated means including a motor, a plurality of gears connected to said motor for drive thereby whenever the motor is actuated, a shaft connected to each of said gears, and selectively operable clutch means for coupling said gears to said shafts.

Other objects and features of the invention will become apparent as the description proceeds, especially when taken in conjunction with the accompanying drawings, illustrating a preferred embodiment of the invention, wherein:

Figure 1 is a side elevation of a seat supporting and adjusting device.

Figure 2 is an end view of the structure shown in Figure 1.

Figure 3 is a fragmentary plan view of the structure shown in Figure 1.

Figure 4 is an end elevational view of the mechanism shown in Figure 3.

Figure 5 is a fragmentary plan view with parts broken away, of the power actuating mechanism.

Figure 6 is a front elevational view of the mechanism shown in Figure 5, with parts broken away.

Figure 7 is an elevational view looking from the right in Figure 6, with parts broken away.

Referring first to Figures 1-4, the mechanism comprises two seat supporting and adjusting devices each adapted to be located at one end of an adjustable vehicle seat. Power means are provided for effecting relative motion between the parts of one of said devices and this motion is transmitted to the other device through a pair of torque rods.

Since the construction of the devices is identical except for the provision of the power drive means on one of such devices, only the device carrying the power drive mechanism is illustrated and the description of the illustrated device will apply equally well to the remaining device, except that the remaining device will not of course have a separate power drive mechanism associated therewith.

The seat adjusting and supporting device comprises a base or rail structure 10 adapted to be fixedly secured to the floor of a vehicle and includes an upwardly open channel 12. Mounted for movement longitudinally of the rail structure 10 is slide structure indicated generally at 14, the structure being supported in the channel 12 by rollers 16 and positioned or firmly guided in the channel by balls 18. The slide structure includes an upwardly extending channel member 20. Connected to the slide structure 14 for movement therewith longitudinally of the base 10 is bar structure which includes a downwardly open channel member 26.

The channel member 26 has at its front end depending leg portions 28, and at the rear thereof depending leg portions 30. Linkage is provided which interconnects the depending leg portions 28 and 30 of the channel member 26 to the slide structure 14.

In detail, the side walls 32 of the channel member 20 have front bell crank levers 34 and rear bell crank levers 36 pivoted thereto as indicated at 38 and 40 respectively. The bell crank lever 34 at its lower end has a pivot connection 42 with the depending leg 28 of the channel 26. In like manner, the bell crank lever 36 has a pivot connection formed by a pin 44 and an elongated slot 46 with the depending leg 30 of the channel 26. The purpose of providing the pin and elongated slot connection 40, 46 is because it is ordinarily desirable to provide for different length lever arms at the front and back of the seat construction, and the non-parallel movement thus resulting is accommodated by the relative sliding permitted by the pin and slot connection.

The bell crank levers 34 and 36 are provided with upper pivot connections 48 and 50 to an elongated link 52 which provides for simultaneous swinging movement of the bell cranks 34 and 36. The link 52 as clearly appears in Figures 2 and 4, is in the form of a downwardly open channel member having the same dimensions as channel member 20. Accordingly, the lower edges of the side flanges of the channel 52 abut against the upper edges of the side walls of the channel 20 to provide stop means for limiting downward movement of the bar 26. It will further be observed that the channels 52 and 20 are firmly guided and supported laterally by virtue of the bell crank members 34 and 36 which abut against the outer surfaces of the side flanges thereof and thus provide a strongly supported and guided structure throughout relative movement between the slide structure and the seat supporting bars 26.

In order to effect swinging of the bell cranks and thus to effect simultaneous vertical movement of the front and rear ends of the seat supporting bar construction 26, a link 54 is provided which is pivoted to the bell crank 34 by the pivot connection 42 previously defined. The upper end of the link 54 is pivotally connected as indicated at 56 to an arm 58 rigidly connected to a cross shaft or torque rod 60. Also rigidly connected to the torque rod 60 and forming with the arm 58 a bell crank system is an arm 62.

In order to effect rotation of the shaft 60 and hence equal vertical movement of the seat supporting bar construction 22 at opposite ends of a vehicle seat supported thereby, the power mechanism best illustrated in Figures 1 and 5–7 is provided. This mechanism will subsequently be described in detail and it is sufficient for the present to note that it includes a gear box 64 mounted on one of said slides and hence movable in a fore and aft direction with said seat. Said gear box includes a pair of pinions each associated with a rack. One of the pinions is illustrated in Figure 1 at 66 and may be considered as the pinion in mesh with a rack 68, one end of which is pivoted as indicated at 70 to the arm 62. The pinion 66 may be rotated in forward or reverse direction by means later to be described.

The parts in Figure 1 are illustrated with the seat supporting bar construction 26 in the lower position. In order to effect vertical upward movement of the seat supporting bar 26, the pinion 66 will be driven by the motor connected thereto in counterclockwise direction, thus moving the rack 68 to the left for swinging the arms 62 and 58 clockwise, and thus raising link 54 so as to effect vertical movement of the forward end of the seat supporting bar structure. This motion which is imparted to the bell crank lever 34 is transmitted to the rear bell crank 36 through the link 52 and the resultant swinging movement of the rear bell crank causes elevation of the rear end of the seat supporting bar structure 26. It will be observed that operation of the power means is effective to cause direct rotary movement of the transverse shaft 60 and at its opposite end this shaft connects with an arm identical with the arm 58 which in turn connects through a link and bell crank identical with the link 54 and bell crank 28 to effect vertical movement of the forward end of the seat supporting bar structure at the opposite end of the seat. The seat supporting bar structure at the opposite end of the seat is of course also provided with a bell crank and link identical with the bell crank 36 and link 52.

In order to effect longitudinal movement of the slide structure 20 and hence of the seat supporting bar structure 26 carried thereby, the rail structure includes an upstanding bracket 72 to which is pivoted as indicated at 74 the rear end of a rack 76. The rack 76 meshes with a pinion coaxial with the pinion 66 but is selectively operable to effect rotation thereof independently of the pinion 66. The rack 76 provides means for effecting movement of the slide structure 14 longitudinally of the rail structure 10 when the pinion in mesh therewith is rotated. It will be understood that rotation of the pinion causes the pinion to roll longitudinally along the rack, which is fixed by its pivot connection 74 against longitudinal movement.

In order to effect equal and simultaneous longitudinal movement of the similar slide structure at the opposite end of the vehicle seat there is provided on the base or rail structure 10 a stationary bracket 80 to which, as indicated at 82, is pivotally secured a link 84.

As best seen in Figure 4, there is provided a second cross shaft or torque rod 86 in addition to the torque rod 60 previously described.

The torque rods 60 and 86 are mounted for rotation in brackets 88 at opposite ends thereof, the brackets being fixedly carried by and slidable with the slide structure indicated generally at 22. Fixed to the ends of the rod 86 are arms 90, the other end of the arms being pivotally connected as indicated at 92 to the link 84 previously described. As a result of this construction movement of the slide structure and seat supporting bar structure longitudinally of the rail structure will result in forced rotation of the torque rod 86. It will of course be understood that at the opposite end of the torque rod 86 the mechanism is provided with an arm, link, and fixed support identical with the arm 90, link 84, and fixed support 80. Accordingly, rotation of the torque rod 86 will result in movement of the slide and slide supported structure at the opposite end of the seat identical with that at the end of the seat associated with the mechanism illustrated in the figures.

Referring now more particularly to Figures 5, 6 and 7, the mechanism for effecting power adjustment of the seat is shown. It will be observed that in general the power mechanism comprises a single reversible electric motor having drive gear means directly connected to one of a plurality of intermeshing gears, each of the intermeshing gears being selectively clutched to a shaft for effecting rotation thereof. The shafts carry worms in driving relation to worm gears which in turn are directly connected to pinions associated with the actuating racks.

As best seen in the figures, the reversible electric motor is shown at 100 having a shaft 102 carrying a drive gear 104. The drive gear 104 meshes with one of a plurality of intermediate gears 106 which as best illustrated in Figure 7, are in mesh with each other. As shown in Figure 5, the gear 104 is meshed with the gear 106 with the axes of the gears skewed and accordingly, the drive gear 104 and the gears 106 have their teeth extending at helix angles so as to provide for this skewed relationship. Conveniently, the gear 104 may be a helical gear and the gears 106 may be spur gears although this relationship is not essential. In any case, each of the gears 106 is mounted for free rotation on a drive shaft 108 carrying a worm 110. Each of the worms 110 is in constant mesh with a worm gear 112, the worm gears being mounted on shafts 114 journalled in bearings 115 and on which are rigidly secured pinions 66 in mesh with the racks 68 and 76 respectively.

Means are provided for effecting a driving relationship to a selected one of the racks 68 or 76 and this means comprises a clutch member 120 keyed to each of the shafts 108 for longitudinal sliding movement with respect thereto. The clutch members 120 are provided with clutch teeth engageable with correspondingly shaped teeth formed on the adjacent ends of the drive gears 106 and are further provided with annular recesses 122 for engagement by an actuating finger 124 connected to the actuating rod 125 of a solenoid 126. The solenoid contains the usual armature (not shown) spring urged in one direction as for example in the direction which results in disengagement of the clutch member 120, and adapted to be urged when energized in the opposite direction to shift the clutch element 120 into clutch engagement with the teeth of the associated drive gear 106. By appropriate wiring it is possible to effect energization of the motor 100 in either of its two directions and simultaneously effect engagement of a selected one of the clutches 120 with its driving gear. Thus, the racks 68 and 76 may be selectively operated from a single motor in forward and reverse movement.

It may be mentioned at this time that it is possible to provide more than two drive gears such as the gears 106, and accordingly, a single motor in the combination shown may be employed to effect selective forward or reverse rotation of any one of a multiplicity of rotary members.

The drawings and the foregoing specification constitute a description of the improved seat adjuster mechanism in such full, clear, concise and exact terms as to enable any person skilled in the art to practice the invention, the scope of which is indicated by the appended claims.

What I claim as my invention is:

1. A vehicle seat adjuster comprising a pair of similar devices adapted to be positioned at opposite ends of a vehicle seat and to support the seat from the floor of the vehicle, each of said devices comprising a fixed rail, a slide movable longitudinally on said rail, a seat support bar, levers pivotally connecting said bar and slide and arranged to provide for generally vertical movement of said bar relative to said slide, power drive means including mechanism carried by one of said slides, said drive means including first means for moving said slide on said rail and second means for raising and lowering said bar, a post on each of said slides, torsion rods pivoted to and extending between said posts, arms fixed to said rods at opposite ends thereof, links connecting the ends of the arms on one of said rods to a support fixed relative to said rails, and links connecting the ends of the arms on the other of said rods to said levers to swing said last named arms upon movement of said levers to effect vertical movement of said bars.

2. A seat adjuster comprising a pair of parallel rails, a slide on each of said rails, drive means including a pinion carried by one of said slides, a rack in mesh with the pinion and fixed to the corresponding rail for moving said slide on said rail, a torque rod pivoted on said slides and extending across the space therebetween, arms fixed to the ends of said rod, links connecting said arms to said rails, said arms and links extending at angles with respect to said rails and slides selected to develop substantial components of force parallel to said rails upon operation of said drive means.

3. A seat adjuster comprising a pair of parallel rails, a slide on each of said rails, drive means including mechanism carried by one of said slides connected to the adjacent rail for moving said slide on said rail, a pair of seat support bars, pairs of levers connecting opposite ends of said bars to said slides, posts carried by said slides, a torque rod carried by said posts, an arm fixed to said rod, motor means carried by the one of said slides adjacent said arm, a pair of arms fixed to said rod adjacent its ends, links connecting said pair of arms to the pair of levers connected to the adjacent ends of said bars.

4. A seat adjuster comprising a pair of parallel rails, a slide on each of said rails, drive means including mechanism carried by one of said slides connected to the adjacent rail for moving said slide on said rail, a pair of seat support bars, pairs of levers connecting opposite ends of said bars to said slides, links connecting the levers at opposite ends of the same bars, posts carried by said slides, a torque rod pivotally carried by said posts, an arm fixed to said rod, motor means carried by one of said slides connected to said arm, a pair of arms fixed to said rod adjacent its ends, links connecting said pair of arms to the pair of levers connected to the adjacent ends of said bars.

5. A seat adjuster comprising a pair of parallel rails, a slide on each of said rails, drive means including mechanism carried by one of said slides connected to the adjacent rail for moving said slide on said rail, a pair of seat support bars, pairs of levers connecting opposite ends of said bars to said slides, links connecting the levers at opposite ends of the same bars, lost motion connections between one pair of said levers and said bars, posts carried by said slides, a torque rod carried by said posts, an arm fixed to said rod, motor means carried by one of said slides adjacent said arm, a pair of arms fixed to said rod adjacent its ends, links connecting said pair of arms to the pair of levers connected to the adjacent ends of said bars.

6. Power actuated seat adjustment mechanism comprising a pair of devices for supporting opposite ends of a seat, one of said devices comprising a fixed rail, a slide movable on said rail, a pair of levers pivoted to opposite ends of said slide, a bar pivotally connected at its opposite ends to said levers, power means including a pair of selectively and reversibly operated pinions mounted for reversible rotation on said slide, a rack in mesh with each of said pinions, means supporting one of said racks against longitudinal movement relative to said rail to produce movement of said slide along said rail by rotation thereof, and linkage means connecting the other of said racks to one of said levers.

7. Power actuated seat adjustment mechanism comprising a pair of devices for supporting opposite ends of a seat, one of said devices comprising a fixed rail, a slide movable on said rail, a pair of levers pivoted to opposite ends of said slide, an elongated link connecting said pair of levers, a bar pivotally connected at its opposite ends to said levers, power means including a pair of selectively and reversibly operated pinions mounted for reversible rotation on said slide, a rack in mesh with each of said pinions, means supporting one of said racks against longitudinal movement relative to said rail to produce movement of said slide along said rail by rotation thereof, and linkage means connecting the other of said racks to one of said levers.

8. Power actuated seat adjustment mechanism comprising a pair of devices for supporting opposite ends of a seat, one of said devices comprising a fixed rail, a slide movable on said rail, a pair of levers pivoted to opposite ends of said slide, a bar pivotally connected at its opposite ends to said levers, power means including a pair of selectively and reversibly operated pinions mounted for reversible rotation on said slide, a rack in mesh with each of said pinions, means supporting one of said racks against longitudinal movement relative to said rail to produce movement of said slide along said rail by rotation of the pinion in mesh therewith, a post carried by said slide, a bell crank pivoted to said post, means connecting one end of the other of said racks to an arm of said bell crank, a link connecting the other arm of said bell crank to one of said levers.

9. Power actuated seat adjustment mechanism comprising a pair of devices for supporting opposite ends of a seat, one of said devices comprising a fixed rail, a slide movable on said rail, a pair of levers pivoted to opposite ends of said slide, an elongated link connecting said pair of levers, a bar pivotally connected at its opposite ends to said levers, power means including a pair of selectively and reversibly operated pinions mounted for reversible rotation on said slide, a rack in mesh with each of said pinions, means supporting one of said racks against longitudinal movement relative to said rail to produce movement of said slide along said rail by rotation of the pinion in mesh therewith, a post carried by said slide, a bell crank pivoted to said post, means connecting one end of the other of said racks to an arm of said bell crank, a link connecting the other arm of said bell crank to one of said levers.

10. Power actuated seat adjustment mechanism comprising a pair of similar devices for supporting opposite ends of a seat, each of said devices comprising a rail, a slide movable longitudinally on said rail, and a bar carried by said slide for vertical adjustment, said slide having an upstanding post, a pair of torque rods pivotally supported by the posts of the slides of said devices, motor means carried by one of said slides, means connecting said motor means and rail for moving said slide therealong, linkage means connecting said motor means to said bar including an arm on one of said rods for raising and lowering said bar, and means connected to the other of said rods operable to rotate said other rod in accordance with movement of said one slide on its associated rail, to transmit like motion from the device carrying said motor means to the other of said devices.

11. Seat adjusting mechanism comprising a rail structure, a slide mounted on said rail structure for longitudinal movement thereon, said slide including an elongated upwardly open channel member, a seat support bar, means connecting said bar to said slide for generally vertical movement with respect to said slide, an elongated downwardly open channel member having side walls the edges of which are adapted to abut the edges of the side walls of the channel member on said slide to limit downward movement of said bar, and means engaged with the outer surfaces of said side walls of both of said channel members to guide and support said channel members relative to each other.

12. Seat adjusting mechanism comprising a rail structure, a slide mounted on said rail structure for longitudinal movement thereon, said slide including an elongated upwardly open channel member, a seat support bar, means connecting said bar to said slide for generally vertical movement with respect to said slide, an elongated downwardly open channel member having side walls the edges of which are adapted to abut the edges of the side walls of the channel member on said slide to limit downward movement of said bar, and lever means pivoted to the side walls of both of said channel members at the exterior thereof engageable with the outer surfaces of said side walls of both of said channel members to guide and support said channel members relative to each other.

13. Seat adjusting mechanism comprising a rail structure, a slide mounted on said rail structure for longitudinal movement thereon, said slide including an elongated seat support upwardly open channel member, a seat support bar, means connecting said bar to said slide for generally vertical movement with respect to said slide, an elongated downwardly open channel member having side walls the edges of which are adapted to abut the edges of the side walls of the channel member on said slide to limit downward movement of said bar, bell crank levers having two arms and pivoted at the junction of their arms to the outside of the side walls of the upwardly open channel member, one of the arms of each of said bell cranks extending upwardly in guiding and supporting relation to the side walls of the downwardly open channel member and being pivoted thereto, the other arm of each of said bell cranks being pivoted to said bar.

14. Seat adjusting mechanism comprising a rail structure, a slide mounted on said rail structure for longitudinal movement thereon, said slide including an elongated upwardly open first channel member, a seat support bar movable generally vertically with respect to said slide and including an elongated downwardly open second channel member having side walls located laterally of the side walls of said first channel member, a downwardly open third channel member the edges of which are adapted to abut the edges of the side walls of the first channel member on said slide to limit downward movement of said bars, bell crank levers having two arms and pivoted at the junction of their arms to the outside of the side walls of the first channel member, one of the arms of said bell cranks extending upwardly in guiding and supporting relation to the side walls of the third channel member and pivoted thereto, the other arms of said bell cranks being pivoted to the side walls of said second channel member, said third channel member constituting a link connected to the upper ends of said arms.

15. Seat supporting and adjusting mechanism comprising an elongated support member in the form of an upwardly open channel, bell crank levers pivoted to said channel adjacent the ends thereof, a seat support bar pivotally connected adjacent its ends to corresponding arms of said bell crank levers a rigid link pivotally connected adjacent its ends to the remaining arms of said bell crank levers, said link comprising a downwardly open channel having the same width as said upwardly open channel, said channels having side walls having straight edges which abut to limit downward movement of said bar.

16. Seat supporting and adjusting mechanism comprising an elongated support member in the form of an upwardly open channel, bell crank levers pivoted to said channel adjacent the ends thereof, a seat support bar pivotally connected adjacent its ends to corresponding arms of said bell crank levers, a rigid link pivotally connected adjacent its ends to the remaining arms of said bell crank levers, said link comprising a downwardly open channel having the same width as said upwardly open channel, said channels having side walls having straight edges which abut to limit downward movement of said bar, said bell cranks being pivoted to the side walls of said channels to provide lateral guiding support thereto during up and down movement of said bar.

References Cited in the file of this patent

UNITED STATES PATENTS

| | | |
|---|---|---|
| 2,003,549 | Miller | June 4, 1935 |
| 2,037,366 | Chapman | Apr. 14, 1936 |
| 2,129,952 | Lustig | Sept. 13, 1938 |
| 2,791,263 | Chayne | May 7, 1957 |
| 2,809,688 | Brundage | Oct. 15, 1957 |
| 2,837,930 | Desmond | June 10, 1958 |